Oct. 28, 1930.   J. L. A. HARRISON   1,779,736
TEAPOT
Filed Jan. 15, 1930
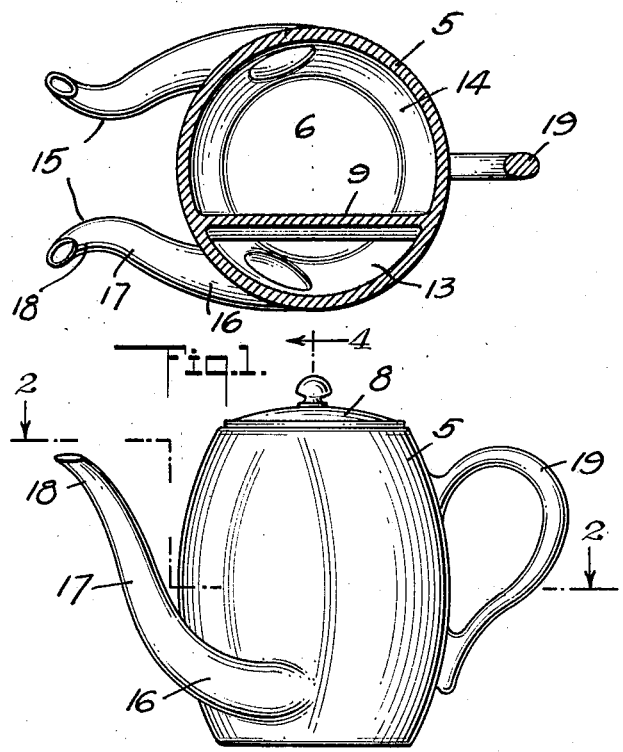
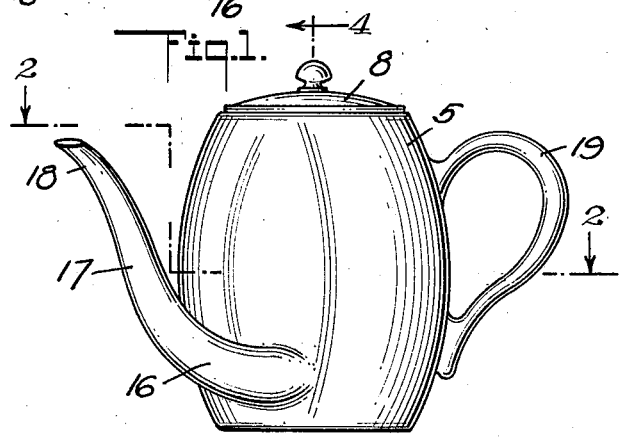
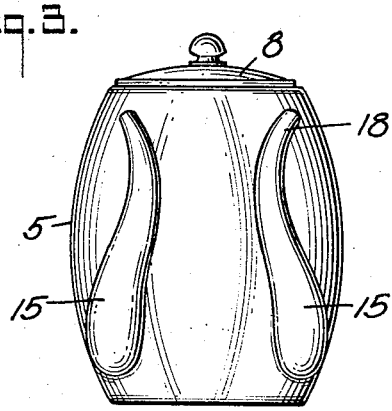
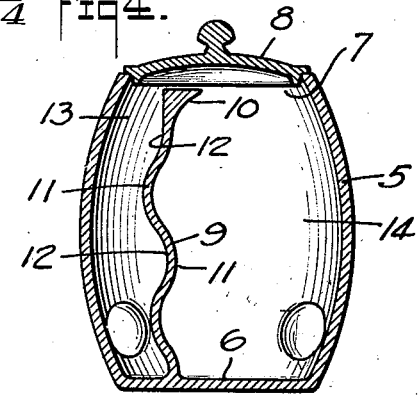
INVENTOR.
JOSEPH LEO A. HARRISON
BY
ATTORNEYS.

Patented Oct. 28, 1930

1,779,736

UNITED STATES PATENT OFFICE

JOSEPH LEO A. HARRISON, OF LOS ANGELES, CALIFORNIA

TEAPOT

Application filed January 15, 1930. Serial No. 420,942.

My invention relates to teapots or similar vessels, and has for its primary object the provision of a vessel having a number of non-communicating compartments and an equal number of discharge spouts, the latter so formed and designed and related to one another and with the respective compartments whereby a canting of the vessel to one side or the other from a common or fixed vertical line will permit liquid contained in one compartment to be poured therefrom without effecting an accidental discharge of liquid from the other compartment. The vessel is particularly, but not necessarily, intended for use in the dispensing of tea, and the arrangement herein provided is such that a quantity of hot water can be contained in one compartment of the vessel, where it will be always available should it be desired to dilute previously prepared tea contained in the other compartment to suit the individual taste. I have stated that the vessel is admirably, and, in fact, particularly, adapted for the dispensing of previously steeped or prepared tea, but it will be appreciated that its uses are many and among others is mentioned the use of one compartment of the vessel for storing a small quantity of cream when the other compartment of the vessel is made to contain a quantity of prepared coffee. In this way, the consumer of the beverage will have convenient access to the cream and at his choice may mix as much thereof with coffee when poured into a cup as he wishes. The invention may also be used for dispensing certain salad dressings or the like, where an intermixing of two or more liquid materials may be objectionable to certain individual tastes, and by the arrangement herein proposed, it follows that a liquid material of one variety can be selectively poured from the vessel without causing an intermixing thereof with liquid matter contained in the other compartment.

Another object of the invention is to provide a vessel of the character stated wherein a single handle is common to a plurality of spouts, the latter communicating with respective compartments of the vessel.

A still further object of the invention is to provide a vessel whose spouts are peculiarly formed and characterized in ways whereby when the vessel is canted to one side of the vertical the liquid contained in the inactive compartment will flow to a level within the spout of that compartment where it will not be liable to escape accidentally.

In the accompanying drawings,

Figure 1 is a view in side elevation of the vessel;

Figure 2 is a section on line 2—2 of Figure 1;

Figure 3 is a view in front elevation of the vessel;

Figure 4 is a vertical section taken on line 4—4 of Figure 1.

In carrying the invention into practice, use is made of a vessel 5, the shape of which is not important. Neither is it important that use be made of a particular material in the manufacture of the vessel. Obviously, it may be formed of pottery, pewter or any other metals or compositions of metals or materials. The vessel is closed at its bottom, as at 6, and is formed at its top with an opening 7 having a removable cover 8.

Extending longitudinally within the vessel is a partition 9 of an undulated contour. This partition extends from the bottom of the vessel to a point near the marginal edge of the opening 7, where it is formed with a deflecting lip 10. By forming the partition with undulations, as above stated, wherein the crests 11 extend respectively in opposite directions and the concavities 12 are likewise related, it follows that when the vessel is tilted to one side the partition through its peculiar formation functions to accommodate the change of level of the liquid in one compartment during the pouring of liquid from the other. The partition divides the vessel into two non-communicating compartments 13 and 14, respectively, which, in the present illustration, are respectively of unequal capacities in that it is intended that the compartment 14 contain hot water, while the compartment 13 may preferably contain previously steeped or prepared liquid tea.

Each compartment is provided with a pouring spout 15, which extends outside of the vessel on a line that first proceeds forwardly at 16, then upwardly at 17, thence along the laterally curved line 18. This gives a converse arrangement of the respective spouts with respect to a common vertical line drawn therebetween, and it follows that when the vessel is canted to one side where use is made of its spout 15, the discharge end of the other spout extends in an upward direction, while the discharge end of the mating spout extends downward.

Formed on the vessel is a handle 19 which is positioned along a line drawn respectively vertically of the vessel and along a line drawn horizontally between the respective spouts 15. In this manner, the handle is common to the two spouts and when grasped in the hand may be manipulated so as to cause a tilting of the vessel either to the right or to the left, depending upon whether liquid is to be poured from the compartment 13 or from the compartment 14. In any event, the arrangement is such that together with the other characterizing features, such, for example, as the peculiar contours of the pouring spouts, liquid can be poured from one compartment without any possibility of accidental escape of liquid from the other. Assuming that the vessel contains quantities of hot water and tea, respectively, it follows that tea may be poured into a cup from the tea compartment and, if found too strong or not exactly to the taste of the consumer, it may be diluted by simply tilting the vessel in an opposite direction to permit the flow of hot water therefrom.

I claim as my invention:

1. A vessel having a vertical partition extending from the bottom of the vessel to the top thereof and dividing the vessel into a plurality of compartments, a plurality of spaced apart forwardly projecting pouring spouts opening into the respective compartments, and a single handle on the vessel common to said plurality of spouts, said handle extending from the vessel along a line parallel with the partition and medially of a line drawn horizontally through the vessel and between said spouts, whereby the vessel when grasped by the handle may be canted to either side of the vertical so that liquid contained in one compartment may be poured from its spout without effecting a discharge of liquid through the spout of the other compartment.

2. A vessel having a vertical partition extending from the bottom of the vessel to the top thereof and dividing the vessel into two compartments, a plurality of spaced apart pouring spouts carried by the vessel and projecting forwardly from the sides thereof, and a single handle carried by the vessel at the rear thereof and occupying a position along a line drawn horizontally through the vessel and between the respective pouring spouts, the said respective pouring spouts having their discharge ends extending angularly relatively so that when the vessel is tilted to one side or the other of the medial line of the vessel when manipulating the handle, liquid may be poured from the spout of a selected one of said compartments without effecting a discharge of liquid from the spout of the other compartment.

JOSEPH LEO A. HARRISON.